United States Patent [19]
Chu

[11] Patent Number: 5,134,182
[45] Date of Patent: Jul. 28, 1992

[54] HYDROCARBON RESISTANT SEALANT COMPOSITION

[75] Inventor: Kwang-Ho Chu, Flemington, N.J.

[73] Assignee: Thomas & Betts Corporation, Bridgewater, N.J.

[21] Appl. No.: 561,356

[22] Filed: Aug. 1, 1990

Related U.S. Application Data

[63] Continuation of Ser. No. 400,251, Aug. 29, 1989, abandoned.

[51] Int. Cl.$^5$ ............................................. C08K 5/52
[52] U.S. Cl. .................................. 524/140; 524/144; 524/149; 524/209
[58] Field of Search ............... 524/142, 143, 144, 149, 524/209, 556, 558, 205, 209, 139, 141, 145, 272, 314, 321, 367, 424, 436, 437, 449, 485, 140

[56] References Cited

U.S. PATENT DOCUMENTS

| | | | |
|---|---|---|---|
| 3,816,143 | 6/1974 | Anderson et al. | 524/142 |
| 3,846,373 | 11/1974 | Takeya et al. | 524/144 |
| 3,928,210 | 12/1975 | Peterson | 524/144 |
| 4,400,483 | 8/1983 | Siedenstrang et al. | 524/247 |
| 4,421,884 | 12/1983 | Oyama et al. | 524/209 |
| 4,478,963 | 10/1984 | McGarry | 524/425 |
| 4,486,480 | 12/1984 | Okumoto et al. | 524/209 |
| 4,487,872 | 12/1984 | Takemoto et al. | 524/127 |
| 4,650,834 | 3/1987 | Yagishita et al. | 525/386 |
| 4,764,539 | 8/1988 | Ladang | 524/143 |
| 4,833,191 | 5/1989 | Bushway et al. | 524/209 |

OTHER PUBLICATIONS

Hawley, Gessner G., "The Condensed Chemical Dictionary", Van Nostrand Reinhold Co., 1981, pp. 1000–1001.

V. M. Kothari, "Application of High Molecular Weight Polyacrylates in Pressure Sensitive Adhesives," (PSTC 12th Ann. Tech. Sem., Itasca, IL., May 3–5, 1989).

Wolf and DeMarco, "Polyacrylic Rubber," *Vanderbilt Rubber Handbook*, (Babbit, ed., R. T. Vanderbilt Co., Norwalk, CT. 1978), pp. 188–206.

*Primary Examiner*—Joseph L. Schofer
*Assistant Examiner*—R. H. Delmendo
*Attorney, Agent, or Firm*—Robert M. Rodrick; Salvatore J. Abbruzzese

[57] ABSTRACT

A composition based upon a blend of lower alkyl or lower alkoxyalkyl polyacrylate ester elastomers with one or more materials selected from liquid butadiene acrylonitrile copolymers and halogenated fire-retardant plasticizers. Blends with the liquid butadiene acrylonitrile copolymers include from about 5 to about 50% by weight of the copolymer and from about 50 to about 95% by weight of the polyacrylate ester elastomer. Blends with the halogenated fire-retardant plasticizer include from about 5 to about 100 parts by weight of the halogenated fire-retardant plasticizer per 100 parts of the polyacrylate ester elastomer. Hydrocarbon-resistant sealant compositions further contain effective amounts of one or more plasticizers in amounts effective to plasticize the blend together with one or more reinforcing materials. Flame-resistant sealant compositions utilize phosphate ester plasticizers and further contain one or more flame-retardant materials including alumina trihydrate, magnesium carbonate and magnesium hydroxide hydrate.

34 Claims, No Drawings

HYDROCARBON RESISTANT SEALANT COMPOSITION

This is a continuation of application Ser. No. 07/400,251, filed Aug. 29, 1989, now abandoned.

BACKGROUND OF THE INVENTION

This invention relates to hydrocarbon-resistant sealants and in particular to hydrocarbon-resistant sealants having acceptable craftability and seal reliability characteristics even when formulated with fire-retardant materials for flame resistance.

The sealants of the present invention are particularly useful for cable splice closures that provide a protective barrier for sealing closures, splice cases or other outside telecommunications apparatus from damage caused by environmental exposure. Historically, cable splice closure sealants were based upon butyl rubber. However, such sealants soften and do not perform well in hydrocarbon contaminated environments commonly found in manholes. Butyl rubber based sealants also fail to meet the flammability standards of new fire resistance requirements for building closures.

In addition to hydrocarbon and flame resistance, cable splice closure sealants must be sufficiently pliable to form a seal during installation. This characteristic is defined as craftability. Once formed, the sealant must maintain seal integrity by adhering to hard substrates such as metal, rubber or plastic across temperature extremes that not only soften or harden the sealant but also subject the seal to stress from the expansion and contraction of the seal assembly. The seal assembly is also subjected to the air pressure to which the cable system is internally pressurized, typically up to 10 psi. The characteristic ability to withstand such environments is known as seal reliability.

Levy et al., *Intern. Wire & Cable Symp.Proc.* 1986, 289-298, discloses the use of oil-resistant rubber to formulate hydrocarbon-resistant sealants. This article discloses that it is not possible with the polymer used to develop a single formulation that is both hydrocarbon and flame resistant and possesses the necessary craftability and seal reliability characteristics. Instead, separate hydrocarbon-resistant and flame-resistant compositions are disclosed. The sealants disclosed possess marginal craftability and seal reliability.

A hydrocarbon-resistant sealant with improved craftability and seal reliability would be highly desirable. It would be even more desirable if such a hydrocarbon-resistant sealant could be made flame resistant by formulation with fire-retardant materials and maintain an acceptable level of craftability and seal reliability.

SUMMARY OF THE INVENTION

It has now been discovered that superior adhesives, mastics and sealants can be formulated based upon a blend of lower alkyl or lower alkoxyalkyl polyacrylate ester elastomers with one or more materials selected from liquid butadiene acrylonitrile copolymers, and one or more fire-retardant plasticizers selected from halogenated organophosphate esters, halogenated organophosphonate esters and halogenated diphenyl oxides. The hydrocarbon-resistant sealant formulations of the invention possess improved craftability and seal reliability over the known hydrocarbon-resistant sealants. Furthermore, sealants based upon either blend when formulated with fire-retardant materials not only meet both flame-resistance and hydrocarbon-resistance requirements, but also maintain acceptable levels of craftability and seal reliability.

Among the compositions of the present invention are compositions containing a polymer blend of a lower alkyl or lower alkoxyalkyl polyacrylate ester elastomer and a liquid butadiene acrylonitrile copolymer, with preferred compositions including polymer blends of from about 50 to about 95% by weight polyacrylate elastomer and from about 5 to about 50% by weight of the liquid butadiene acrylonitrile copolymer.

Preferred hydrocarbon-resistant sealant compositions based upon this polymer blend of the present invention also contain one or more plasticizers in an amount effective to plasticize the polymer blend and one or more reinforcing materials.

The present invention includes the discovery that sealants based upon polymer blends of lower alkyl or lower alkoxyalkyl polyacrylate ester elastomers and a liquid butadiene acrylonitrile copolymer possess a unique combination of hydrocarbon-resistance, pliability and adhesion to hard metal, rubber and plastic substrates that results in craftability and seal reliability heretofore unknown in hydrocarbon-resistant sealants. These characteristics are maintained even when the sealant is formulated with fire-retardant materials for flame resistance.

The present invention also includes the discovery that materials such as halogenated organophosphate esters, halogenated organophosphonate esters and halogenated diphenyl oxides, known to those of ordinary skill in the sealant art as fire-retardant additives, also efficiently plasticize the polyacrylate elastomer to such a degree that compositions that include this fire retardant as a plasticizer may optionally omit the liquid butadiene acrylonitrile copolymer. Stated another way, among the sealant compositions of the present invention are compositions based solely upon a polyacrylate ester elastomer containing one or more fire-retardant plasticizers selected from halogenated organophosphate esters, halogenated organophosphonate esters, and halogenated diphenyl oxides. Preferred sealants of the present invention based solely upon the polyacrylate elastomer include from about 5 to about 100 parts by weight of the one or more fire-retardant halogenated plasticizers per 100 parts by weight of the elastomer.

As with the compositions of the invention based upon the polymer blend of polyacrylate with liquid butadiene acrylonitrile copolymer, more preferred hydrocarbon-resistant sealant compositions based solely upon polyacrylate elastomers combine one or more fire-retardant halogenated plasticizers with one or more other plasticizers so that these more preferred compositions contain one or more plasticizers including the one or more fire-retardant halogenated plasticizers in an amount effective to plasticize the polyacrylate elastomer. More preferred compositions additionally contain one or more reinforcing materials.

The hydrocarbon-resistant sealants in accordance with the present invention, whether based solely upon a polyacrylate elastomer or upon a blend of the elastomer with a liquid butadiene acrylonitrile copolymer, may also contain one or more optional additives such as polyisobutylene, one or more flame-retardant materials, hydrocarbon-resistant tackifying resins, processing aids, dispersing aids, anti-oxidants and stabilizers.

Sealants that are both hydrocarbon-resistant and flame-resistant according to preferred aspects of the present invention utilize fire-retardant phosphate ester plasticizers selected from a group including halogenated organophosphate esters, halogenated organophosphonate esters and halogenated diphenyl oxides. Accordingly, the fire-retardant halogenated plasticizers are not used only to plasticize sealant compositions based solely upon polyacrylate elastomers.

Among the more preferred flame-resistant compositions are sealants based upon a polymer blend of a polyacrylate elastomer and a liquid butadiene acrylonitrile copolymer containing one or more fire-retardant halogenated plasticizers in an amount effective to plasticize the polymer blend. The flame-resistant sealant compositions of the invention further contain one or more fire-retardant materials including alumina trihydrate, magnesium carbonate, magnesium hydroxide hydrate and the like.

The liquid butadiene-acrylonitrile copolymer and halogenated fire-retardant plasticizers allow the sealant compositions of the present invention to be formulated with significant quantities of fire-retardant materials, thereby providing compositions with a unique combination of flame-resistance, hydrocarbon-resistance, craftability and seal reliability.

DETAILED DESCRIPTION OF THE PREFERRED EMBODIMENT

A sealant in accordance with one embodiment of the present invention includes a blend of lower alkyl or lower alkoxyalkyl polyacrylate ester elastomers with either a liquid butadiene acrylonitrile copolymer or one or more halogenated fire-retardant plasticizers, or both. In this preferred embodiment, the above polyacrylate esters have been found to possess the most suitable compatibility with the liquid butadiene acrylonitrile copolymer, the halogenated fire-retardant plasticizers and the other sealant ingredients over the range of temperatures to which the sealant is subjected. This compatibility in turn provides a pliable, adherent polymer backbone to the sealant of the invention, from which it derives unique craftability and seal reliability characteristics.

Preferred polyacrylate elastomers contain polymer units of lower alkyl or lower alkoxyalkyl acrylate esters having ester groups containing up to six carbon atoms. Even more preferred polymer units are ethyl, butyl and methoxyethyl esters of acrylic acid. The polyacrylates of the invention may contain polymer units derived from one or more of the suitable acrylate esters.

Typical polyacrylate esters suitable for use in the present invention include the CYANACRYL ® series of acrylic elastomers manufactured by American Cyanamide, and HYCAR ® series of acrylic elastomers manufactured by B. F. Goodrich Company. Of the CYANACRYL ® and HYCAR ® series, CYANACRYL ® R and HYCAR ® 4054 are preferred as the most oil-resistant members of each series.

In one embodiment, the sealant includes a liquid butadiene acrylonitrile copolymer in a polymer blend with the polyacrylate ester elastomer. As used in this disclosure, the term "liquid" butadiene acrylonitrile copolymer means butadiene acrylonitrile copolymers which, when pure, have Brookfield viscosities between about 5,000 and about 100,000 cP at 50° C., measured according to ASTM procedures. This liquidity is necessary in order to provide low temperature craftability to the compositions of the invention without sacrificing high temperature seal reliability and in order to maintain these properties when fire-retardant materials are included in the composition.

A typical liquid butadiene acrylonitrile copolymer is HYCAR ® 1312 manufactured by B. F. Goodrich Company.

With respect to the weight ratio of polyacrylate elastomer to liquid butadiene acrylonitrile copolymer within the polymer blend, the blend will typically contain from about 50 to about 95% by weight of the polyacrylate elastomer and from about 5 to about 50% by weight of the liquid butadiene acrylonitrile copolymer. Preferred polymer blends will contain from about 60 to about 85% by weight of the polyacrylate elastomer and from about 15 to about 40% by weight of the liquid butadiene acrylonitrile copolymer.

In the embodiment of the sealant in which the liquid butadiene acrylonitrile copolymer is omitted and the sealant composition is based solely on a polyacrylate elastomer, the elastomer is blended instead with one or more halogenated fire-retardant plasticizers which function to plasticize the elastomer.

The halogenated fire-retardant plasticizers are selected from halogenated organophosphate esters, halogenated organophosphonate esters and halogenated diphenyl oxides. Suitable ester groups for the halogenated organophosphate esters and the halogenated organophosphonate esters include benzyl, alkyl, alkylbenzyl, alkoxyalkyl and phenoxyalkyl groups. The halogenated organophosphate esters and halogenated organophosphonate esters typically contain more than one ester group, and the multiple ester groups may be the same or different. Furthermore, as is well known by those of ordinary skill in the art, commercial grades of such plasticizers may contain mixtures of several halogenated organophosphate esters or of several halogenated organophosphonate esters.

Typical halogenated organophosphate ester fire-retardant plasticizers include tri(beta-chloroethyl) phosphate, tri(beta, beta'-dichloroisopropyl) phosphate, tetrakis(2-chloroethyl)ethylene diphosphate, tetrakis(2-chloroisopropyl)ethylene diphosphate and chlorinated oligomeric phosphate esters such as FYROL ® 99 manufactured by Akzo Chemie America. Tetrakis(2-chloroethyl)ethylene diphosphate is manufactured by Olin Chemical under the brand name THERMOLIN ® 101. The most preferred halogenated organophosphate ester fire-retardant plasticizers are the chlorinated oligomeric phosphate esters and tetrakis(2-chloroethyl) ethylene diphosphate.

Typical halogenated organophosphonate esters include bis (2-chloroethyl) -2-chloroethanephosphonate and chlorinated oligomeric phosphonate esters such as the ANTIBLAZE ® series of chlorinated oligomeric phosphonate esters manufactured by Albright & Wilson's. The most preferred halogenated organophosphonate fire-retardant plasticizers are the chlorinated oligomeric phosphonate esters.

The most preferred halogenated diphenyl oxide is pentabromodiphenyl oxide.

With respect to the weight ratio of the polyacrylate elastomer to halogenated fire-retardant plasticizers, typical formulations will contain from about 5 to about 100 parts by weight of the one or more halogenated fire-retardant plasticizers per 100 parts by weight of the polyacrylate elastomer. Preferred formulations will contain form about 30 to about 75 parts by weight of the one or more halogenated fire-retardant plasticizers per 100 parts by weight of the polyacrylate elastomer.

Any compound suitable for use in sealant compositions as a polymer plasticizer can be employed to plasticize the sealants of this invention. As is known to those of ordinary skill in the art, the choice of plasticizer will depend upon the polymer to be plasticized and should be selected based upon the ability of the plasticizer to plasticize the polymer over the range of temperatures to which the sealant is exposed. The broader the temperature range over which the plasticizer is functional within the temperature exposure range of the sealant, the more preferred the plasticizer.

The plasticizers may be used both to plasticize sealants based on the polymer blend of polyacrylate elastomer and liquid butadiene acrylonitrile copolymer, and as an additional plasticizer for sealants based solely on a polyacrylate elastomer plasticized with a halogenated fire-retardant plasticizer. In either case, preferred plasticizers include esters of lower alkyl dicarboxylic acids and phosphate ester plasticizers. Preferred lower alkyl dicarboxylic acid esters are based upon dicarboxylic acids of up to seven carbon atoms in length. Suitable ester groups for the dicarboxylic acid phosphate ester plasticizers include benzyl, alkyl, alkylbenzyl, alkoxyalkyl and phenoxyalkyl groups. As with the halogenated organophosphates and the halogenated organophosphonates, the dicarboxylic acid, phosphate ester plasticizer compounds typically contain more than one ester group, and the multiple ester groups may be the same or different, and commercial grades of such plasticizers may contain mixtures of several dicarboxylic acid esters or several phosphate esters.

Preferred dicarboxylic acid ester plasticizers include the alkyl benzyl phthalates having alkyl groups of up to ten carbon atoms. Mixtures of alkyl benzyl phthalates may be used. Also included among the preferred dicarboxylic acid ester plasticizers are the alkoxyalkyl esters of adipic or hexanedioic acid, such as the bis[2-(2-butoxyethoxy)ethyl] ester of hexanedioic acid known commercially as TP-95.

Preferred phosphate ester plasticizers include isopropylphenyl diphenyl phosphate, 2-ethylhexyl diphenyl phosphate, isodecyl diphenyl phosphate, t-butyl phenyl diphenyl phosphate, tricresyl phosphate, tributyl phosphate, tributoxyethyl phosphate, and triphenyl phosphate. The most preferred phosphate ester plasticizer is tricresyl phosphate. The phosphate ester plasticizers contribute to the flame-resistance of the sealant compositions. Accordingly, flame-resistant compositions will contain a phosphate ester plasticizer and optionally one or more of the other suitable plasticizers.

In addition to being used to plasticize sealant compositions based solely upon polyacrylate elastomers, the above-disclosed halogenated fire-retardant plasticizers, namely the halogenated organophosphate esters, halogenated organophosphonate esters and the halogenated diphenyl oxides are also preferred plasticizers for sealant compositions based on polymer blends of polyacrylate elastomer and liquid butadiene acrylonitrile copolymers.

Any art-recognized reinforcing material suitable for use in sealant compositions can be used in the practice of the invention both for those sealant compositions based upon polymer blends of polyacrylate elastomer and liquid butadiene acrylonitrile copolymer and those sealant compositions based solely upon the polyacrylate elastomer plasticized with the one or more halogenated fire-retardant plasticizers. Typical reinforcing materials include KEVLAR ® brand aramid fiber pulp, carbon black, mica, hydrated silica, colloidal silica, mineral or organic fibers and the like. The preferred reinforcing materials are carbon black and aramid pulp.

The sealants can optionally contain one or more art-recognized additives such as fire retardants, polyisobutylene, processing aids, dispersing aids, antioxidants and stabilizers, both for those sealant compositions based upon polymer blends of polyacrylate elastomer and liquid butadiene acrylonitrile copolymer and those sealant compositions based solely upon the polyacrylate elastomer plasticized with the halogenated fire-retardant plasticizers.

Any art recognized fire-retardant material suitable for use in sealant compositions can be used in the practice of the invention. For purposes of this invention, fire-retardant materials are defined as fire retardants that do not otherwise function as plasticizers. Typical fire-retardant materials include alumina trihydrate, magnesium carbonate, magnesium hydroxide hydrate and the like. Alumina trihydrate is the preferred fire-retardant material.

Any art recognized polyisobutylene suitable for use in sealant compositions can be used in the practice of the invention. Lower molecular weight grades of polyisobutylene are preferred, such as VISTANEX ® LMMH manufactured by Exxon Chemical.

Any art recognized hydrocarbon resistant tackifying resin suitable for use in sealant compositions can be used in the practice of the invention. Preferred hydrocarbon-resistant tackifying resins include:

(1) natural and modified rosins such, for example, as gum rosin, wood rosin, tall-oil rosin, distilled rosin, hydrogenated rosin, dimerized rosin and polymerized rosin;

(2) glycerol and pentaerythritol esters of natural and modified rosins, such, for example, as the glycerol ester of pale wood rosin, the glycerol ester of hydrogenated rosin, the glycerol ester of polymerized rosin, the pentaerythritol ester of hydrogenated rosin, and the phenolic modified pentaerythritol ester of rosin;

(3) phenolic-modified terpene resins such, for example, as the resin product resulting from the condensation in an acidic medium of a bicyclic terpene and a phenol, such resin product having a softening point of from about 60° to about 140° C.; and (4) aromatic petroleum hydrocarbon resins and the hydrogenated derivatives thereof, such, for example, as the resin product resulting from the polymerization of monomers consisting primarily of styrene, alpha-methyl styrene and vinyl toluene.

Especially preferred tackifying resins are terpene phenolic resins having a softening point between about 90° and about 140° C. and rosins, the softening points of which are characteristically lower than the softening points of polymerized resins. One or more tackifying resins may be used in the sealant compositions of the invention.

If hydrocarbon-resistance is not critical, then any tackifying resin suitable for use in sealant compositions can be used, and other suitable tackifying resins also include:

(1) non-aromatic polyterpene resins resulting from the low temperature Fridel-Crafts polymerization of terpene hydrocarbons, such as the bicyclic monoterpene known as pinene, (2) aliphatic petroleum hydrocarbon resins resulting from the polymerization of monomers consisting primarily of olefins and diolefins as well as the hydrogenated derivatives thereof, and (3) other aliphatic petroleum hydrocarbon resins known to those of ordinary skill in the art as well as the hydrogenated derivatives thereof.

Any art recognized antioxidant or stabilizer suitable for use in sealant compositions can be used in the practice of the invention. Suitable antioxidants and stabilizers include hindered phenols and multi-functional phenols. Higher molecular weight hindered and multi-functional phenols are especially preferred. Hindered phenols are well known to those drilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include butylated hydroxyanisole (BHA) and butylated hydroxytoluene (BHT). Representative multi-functional phenols include sulfur and phosphorus-containing phenols.

With respect to proportions, the hydrocarbon resistant sealant composition formulations taught herein are based upon 100 parts by weight of either the polyacrylate elastomer for those sealant compositions based solely upon same or the polymer blend. For those sealant compositions based upon 100 parts of the polymer blend, the 100 parts can contain between about 50 and about 95 parts by weight of the polyacrylate elastomer and between about 5 and about 50 parts by weight of the liquid butadiene acrylonitrile copolymer and preferably between about 60 and about 85 parts of the polyacrylate elastomer and about 15 and about 40 parts of the liquid butadiene acrylonitrile copolymer.

For every 100 parts of the polymer blend the hydrocarbon resistant sealant compositions typically contain one or more plasticizers in amounts between about 15 and about 190 parts by weight, preferably between about 45 and about 135 parts by weight; and one or more reinforcing materials in amounts between about 10 and about 75 parts by weight, preferably between about 20 and about 55 parts by weight.

Flame-resistant, hydrocarbon-resistant sealant compositions based upon 100 parts of the polymer blend further contain fire-retardant materials in amounts between about 100 and about 300 parts by weight, preferably between about 150 and about 250 parts by weight. These sealants preferably include from about 10 to about 140 parts by weight, preferably from about 45 to about 110 parts by weight of one or more phosphate ester plasticizers and one or more halogenated fire-retardant plasticizers in amounts between about 5 and about 110 parts by weight, preferably between about 25 and about 80 parts by weight.

For those compositions omitting the liquid butadiene acrylonitrile copolymer for every 100 parts of the polyacrylate elastomer the hydrocarbon-resistant sealant compositions typically contain one or more halogenated fire-retardant plasticizers in amounts between about 5 and about 100 parts by weight, preferably between about 35 and 80 parts by weight; and one or more reinforcing materials in amounts between about 10 and about 90 parts by weight, preferably between about 30 and about 60 parts by weight.

Flame-resistant, hydrocarbon resistant compositions based upon 100 parts of polyacrylate elastomer further contain fire-retardant materials in amounts between about 50 and about 300 parts by weight, preferably between about 150 and about 250 parts by weight.

In more preferred flame-resistant compositions, the additional plasticizers, if any, for sealants based solely on a polyacrylate elastomer plasticized with a halogenated fire-retardant plasticizer, are phosphate ester plasticizers.

The flame resistance of sealant materials is determined by measuring the Oxygen Index in accordance with ASTM D2863. Construction codes require building closure sealants to have an Oxygen Index of at least 28. The prior art flame-retardant sealant has an Oxygen Index of 28 and marginally meets the construction code requirement. The sealants of the present invention, whether based solely upon polyacrylate elastomers or a blend of the elastomer with liquid butadiene acrylonitrile copolymer, when formulated with from about 100 to about 300 parts of fire-retardant materials, from about 10 to about 140 parts by weight of a phosphate ester plasticizer per 100 parts of the polymer or polymer blend, and from about 5 to about 110 parts of a halogenated fire-retardant plasticizer, per 100 parts of the polymer or polymer blend, possess Oxygen Indexes greater than 30.

The sealant compositions of the present invention optionally include polyisobutylene in amounts up to about 40 parts by weight, preferably between about 10 and about 30 parts by weight when based upon the polymer blend; and up to about 50 parts by weight, preferably between about 15 and about 35 parts by weight, when based solely upon the polyacrylate elastomer. The sealant compositions may optionally include hydrocarbon resistant tackifying resins in amounts up to about 60 parts by weight, preferably between about 10 and about 40 parts by weight, both when based on the polymer blend and when based solely upon the polyacrylate elastomer. The sealant compositions may optionally include the processing aid or dispersing aid in amounts up to about 2.5 parts by weight, preferably between about 0.25 and about 1.5 parts by weight both when based upon the polymer blend and when based solely upon the polyacrylate elastomer. The sealant composition may also optionally include the antioxidant or stabilizer in amounts up to about 2.5 parts by weight, preferably between about 0.25 and about 1.5 parts by weight, both when based upon the polymer blend and when based solely upon the polyacrylate elastomer.

The sealant compositions may be formulated using techniques known in the art. An exemplary procedure involves heating the polyacrylate elastomers in a heavy-duty Brabender or Baker-Perkins type blade mixer at temperatures that may range from about 100° C. to about 140° C. with mixing for a period of time sufficient to render the elastomer molten. For example, the elastomer may be heated under these conditions for a period of about 30 minutes just prior to mixing with the remaining ingredients of the sealant composition.

A preferred procedure involves mixing the heated elastomer with the hardest ingredients first, such as the reinforcing materials and any fire-retardant materials. These materials are added together with a portion of the liquid butadiene acrylonitrile copolymer, if any, or with a portion of the halogenated fire-retardant plasticizers in a quantity sufficient to wet out the harder ingredients so that they can bind to and blend with the polyacrylate elastomer. Once a smooth uniform homogeneous mass is formed, the remainder of any liquid butadiene acrylonitrile copolymer is added followed by the remainder of the ingredients beginning with the higher softening point materials, if any, such as the polyisobutylene, followed by the tackifying resin, if any, then the liquid ingredients. The addition of these components is extended over a prolonged period of time in order to avoid the formation of lumps. Mixing and heating are continued until a smooth, homogeneous mass is obtained. The mass is then removed from the mixer and may thereafter be formed into various final shapes by known sealant manufacturing techniques.

The techniques associated with the preparation of the products are well known and the present method may vary somewhat depending upon the specific product to be manufactured without departing from the essential parameters relating to the addition of harder reinforcing materials and solid fire-retardant materials to a polyacrylate elastomer together with liquid ingredients. Such other details are presented for purposes of illustration and to provide a best mode for the practice of the invention, and therefore, the invention should not be limited to those parameters.

It is also recognized and contemplated that the above-disclosed formulations may be further varied to meet other end-use requirements and that such formula modifications are well within the purview of one of ordinary skill in the art. For example, in applications where hydrocarbon-resistance is not desired, a portion of the plasticizer may also be replaced by napthenic or paraffinic process oils, or minor amounts of waxes such as microcrystalline waxes, paraffins, synthetic low molecular weight polyethylene and Fischer-Tropsch waxes, etc.

It is additionally recognized and contemplated that the mixture of the polyacrylate elastomer with the liquid butadiene acrylonitrile copolymer or the halogenated organophosphate ester plasticizer fire retardant is suitable for use as a polymer base for virtually any mastic or sealant end use application and not just the specific end uses contemplated by the present invention. The polymer mixture is also suitable as a polymer base for pressure sensitive and non-pressure sensitive adhesive compositions, which compositions may be adapted from the sealant formulations of the present invention by reducing or eliminating the reinforcing materials and/or fire retardants and replacing same with conventional formulating ingredients such as process oils, waxes, plasticizers and the like as is well known to those of ordinary skill in the adhesive and sealant formulating art.

In the examples that follow, the sealants prepared were subjected to the tests described below:

FIRE RESISTANCE

Fire resistance was measured as in the above-cited Levy article, by determination of the oxygen index of the sealant per ASTM D2863. A minimum value of 28 is required.

PEEL ADHESION

Peel adhesion to polyethylene, the substrate material of cable and closure assembly components, is also measured as described in the Levy article. One by three inch strips of jacket grade low density polyethylene are cut and formed into peel specimens by placing a one by two inch length by ⅛ inch sealing tape on the polyethylene strip ⅛ inch from the end, placing another strip of polyethylene on top of the length of sealing tape and compressing the assembly at 300 psi for 30 seconds to form an adhesive bond between the tape and polyethylene. The sealing tapes are formed from the prepared sealant compositions and a control composition of a commercially available fire-resistant sealant material. A "T" peel test is then performed on the sample at a crosshead speed of 20 inches/minute. The peak as well as the average peel values are reported as the adhesion to polyethylene.

HYDROCARBON RESISTANCE

As in the Levy article, the weight of each peel assembly was determined, and the assemblies were placed in containers filled with iso-octane, sealed and kept under laboratory ambient conditions. At regular intervals assembly samples were removed from the iso-octane, conditioned for 1-2 hours and peel tested as described above. The condition of the sealant was also observed for yellowing or cracking. Then the assemblies were left out under laboratory ambient conditions for at least six hours after being removed from the iso-octane. The change in weight of each assembly was then determined. This procedure was followed to a maximum aging time of 15 days.

The following examples are given to illustrate the invention, but are not deemed to be limiting thereof. All percentages given throughout the specification are based upon weight unless otherwise indicated.

EXAMPLES

EXAMPLES 1-5

These examples illustrate the preparation of sealant compositions using varying ratios of polyacrylate elastomer and liquid butadiene acrylonitrile copolymer.

TABLE I

| Example | 1 | 2 | 3 | 4 | 5 |
|---|---|---|---|---|---|
| HYCAR ® 4054 | 50 | 50 | 65 | 70 | 80 |
| HYCAR ® 1312 | 50 | 50 | 35 | 30 | 20 |
| VISTANEX ® LMMH | — | — | 20 | 20 | 20 |
| Alumina Trihydrate (HYDROL ® 710) | 200 | 200 | 200 | 200 | 200 |
| Carbon Black | 30 | 30 | 30 | 30 | 30 |
| KEVLAR ® Pulp | 1 | 1 | 1 | 1 | 1 |
| Tepene Phenolic Resin (NIREZ ® V2040) | 20 | 20 | 20 | 15 | 15 |
| FYROL ® 99 | — | 10 | 25 | 25 | 35 |
| Tricresyl Phosphate (LINDOL ®) | 65 | 45 | 50 | 50 | 40 |
| Alkyl benzyl phthalate (SANTICIZER ® 278) | 10 | 10 | — | — | — |
| Stearic Acid | 1.5 | 1.5 | 1.5 | 1.5 | 1.5 |

In this example, a heavy duty mixer which had been heated to 135° C. was charged with the polyacrylate elastomer, alumina trihydrate, carbon black, KEVLAR ® pulp and half of the liquid butadiene acrylonitrile copolymer, and stirring was initiated. Once a homogeneous mass was obtained, the remainder of the liquid butadiene acrylonitrile copolymer was added slowly followed by the polyisobutylene with continued stirring. When a homogeneous mass was again obtained, the tackifying resin was added with continued stirring. When a uniform homogeneous mass again formed, the plasticizers and the FYROL ® 99 were then added with stirring. Stearic acid was added as a processing aid. When a uniform homogeneous mass was again obtained, the molten mixture was recovered, and as it cooled, it was formed into sealant tapes.

The precise amounts of each component are shown in Table I. The samples were tested for flame resistance, the test results of which are shown in Table II, polyethylene adhesion, the test results of which are shown in Table III, and iso-octane resistance, the test results of which are shown in Table IV. The samples were tested against AT&T "D" sealing tape as a control.

As can be seen from the data, the samples are more flame-resistant than the control and adhere better to polyethylene. Peel adhesion improves as less liquid butadiene acrylonitrile copolymer is used. Iso-octane resistance showed improved bond adhesion as less of the liquid copolymer was used, although visible signs of sealant cracking were observed in those samples having less of the liquid copolymer.

TABLE II

| Sample | Oxygen Index |
|---|---|
| Control | 28 |
| 1 | 35 |
| 2 | 35 |
| 3 | 35 |
| 4 | 39 |
| 5 | 35 |

TABLE III

| | Polyethylene Adhesion (lbs./in width) | |
|---|---|---|
| Sample | Peak | Run |
| Control | 1.0 | 1.0 |
| 1 | 2.1 | 0.9 |
| 2 | 2.6 | 0.9 |
| 3 | 6.9 | 3.0 |
| 4 | 4.6 | 3.0 |
| 5 | 8.4 | 5.5 |

TABLE IV

| Sample | Iso-Octane Resistance | | |
|---|---|---|---|
| | Visual Appearance | | |
| Control | No color change, no cracks | | |
| 1 | No color change, no cracks | | |
| 2 | No color change, no cracks | | |
| 3 | No color change, no cracks | | |
| 4 | No color change, cracked | | |
| 5 | No color change, cracked | | |
| | % Weight Change | | |
| | Day 1 | Day 2 | Day 7 |
| Control | +3.0 | +3.2 | −0.5 |
| 1 | +2.0 | +0.8 | −1.8 |
| 2 | +0.8 | +0.2 | −2.7 |
| 3 | +6.8 | +8.0 | +6.8 |
| 4 | +5.9 | +8.0 | +11.0 |
| 5 | +7.6 | +9.4 | +13.2 |
| | Run Adhesion (lbs./in width) | | |
| | Day 1 | Day 2 | Day 4 | Day 8 |
| Control | 0.7 | 0.4 | 0.4 | 0.4 |
| 1 | 1.2 | 0.6 | 0.6 | 0.5 |
| 2 | 1.3 | 1.0 | 1.2 | 0.5 |
| 3 | 1.6 | 1.7 | 1.6 | 1.2 |
| 4 | No Data | | | |
| 5 | 6.2 | 4.6 | 5.1 | 4.0 |

EXAMPLES 6 AND 7

These examples illustrate sealant compositions using increased levels of alumina trihydrate and carbon black. The samples were prepared as in Example 1-5 and equivalently tested against the same control. The precise amounts of each component are shown in Table V.

TABLE V

| Example | 6 | 7 |
|---|---|---|
| HYCAR ® 4054 | 65 | 70 |
| HYCAR ® 1312 | 35 | 30 |
| VISTANEX ® LMMH | 20 | 20 |
| Alumina Trihydrate (HYDROL ® 710) | 250 | 200 |
| KEVLAR ® Pulp | 1 | 1 |
| Carbon Black | 30 | 50 |
| Terpene Phenolic resin (NIREZ ® V2040) | 20 | 15 |
| FYROL ® 99 | 25 | 35 |
| Tricresyl Phosphate (LINDOL ®) | 50 | 40 |
| Stearic Acid | — | 1.5 |

The test results are flame resistance and polyethylene adhesion are shown in Table VI, while the test results for iso-octane resistance are shown in Table VII.

TABLE VI

| | Flame Resistance | Polyethylene Adhesion | |
|---|---|---|---|
| Sample | Oxygen Index | Peak | Run |
| Control | | 1.0 | 1.0 |
| 6 | | 4.6 | 2.5 |
| 7 | | 6.9 | 4.2 |

TABLE VII

| Sample | Iso-Octane Resistance | | |
|---|---|---|---|
| | Visual Appearance | | |
| Control | No color change, cracked | | |
| 6 | No color change, no cracks | | |
| 7 | No color change, cracked | | |
| | % Weight Change | | |
| | Day 1 | Day 2 | Day 7 |
| Control | +3.0 | +3.2 | −0.5 |
| 6 | +5.8 | +7.4 | +5.2 |
| 7 | +7.6 | +9.4 | +13.2 |
| | Run Adhesion (lbs./in width) | | |
| | Day 1 | Day 2 | Day 4 | Day 8 |
| Control | 0.7 | 0.4 | 0.4 | 0.4 |
| 6 | 2.7 | 2.0 | 2.6 | 1.4 |
| 7 | 5.2 | 4.6 | 5.1 | 4.0 |

The sample with increased alumina trihydrate showed increased flame resistance with a slight decrease in adhesion, although the adhesion was still a significant improvement over the control. The sample with increased carbon black showed an improvement in bond strength without a loss of flame resistance or hdyrocarbon resistance.

EXAMPLES 8-10

These examples illustrate the preparation of sealant compositions with different tactifying resins. The samples were prepared as in Examples 1-5 and equivalently tested against the same control. The precise amounts of each component are shown in Table VIII. The test results for flame resistance and polyethylene adhesion are shown in Table IX, and the test results for iso-octane resistance are shown in Table X.

TABLE VIII

| Example | 8 | 9 | 10 |
|---|---|---|---|
| HYCAR ® 4054 | 65 | 65 | 70 |
| HYCAR ® 1312 | 35 | 35 | 30 |
| VISTANEX ® LMMH | 20 | 20 | 20 |
| Alumina Trihydrate (HYDROL ® 710) | 200 | 200 | 200 |
| KEVLAR ® Pulp | 1 | 1 | 1 |
| Carbon Black | 30 | 40 | 40 |
| SUPER BECKACITE ® 24-024 (Terpene-Phenolic resin) | 20 | 10 | 10 |
| NIREZ ® U2040 | — | — | — |
| VISANOL ® (Rosin Acid) | — | — | 10 |
| FYROL ® 99 | 25 | 25 | 35 |
| Tricresyl Phosphate (LINDOL ®) | 50 | 1.5 | 40 |
| Stearic Acid | 1.5 | 1.5 | 1.5 |

Comparable flame resistance adhesion and iso-octane resistance results were obtained, indicating that these tackifying resins are suitable and also contribute to a marked improvement over the control.

TABLE IX

| Sample | Flame Resistance Oxygen Index | Polyethylene Adhesion Peak | Polyethylene Adhesion Run |
|---|---|---|---|
| Control |  | 5.6; 5.3 | 2.7 |
| 8 |  | 6.8 | 2.5 |
| 9 |  | 9.4 | 4.1 |
| 10 |  | 3.9 | 4.3 |

TABLE X

| Sample | Iso-Octane Resistance Visual Appearance |
|---|---|
| Control | No color change, cracked |
| 8 | Yellowed, no cracks |
| 9 | No color change, cracked |
| 10 | No color change, cracked |

| % Weight Change | Day 1 | Day 2 | Day 7 |
|---|---|---|---|
| Control | +3.0 | +3.2 | −0.5 |
| 8 | +6.2 | +7.2 | +8.0 |
| 9 | +9.8 | +13.0 | +11.4 |
| 10 | +7.0 | +9.0 | +12.0 |

| Run Adhesion (lbs./in width) | Day 1 | Day 2 | Day 4 | Day 8 |
|---|---|---|---|---|
| Control | 1.5 | 3.0 | 1.7 | 0 |
| 8 | 2.9 | 2.8 | 4.5 | 2.7 |
| 9 | 3.6 | 3.8 | 3.6 | 2.0 |
| 10 | 2.4 | 2.8 | 3.1 | 3.4 |

The invention being thus described, it will be obvious that the same will be varied in many ways. Such variations are not to be regarded as a departure from the spirit and scope of the invention and all such modifications are intended to be included within the scope of the following claims.

I claim:

1. An adhesive, sealant or mastic composition consisting of a uniform, homogeneous blend of a lower alkyl or lower alkoxyalkyl polyacrylate elastomer, a liquid butadiene acrylonitrile copolymer, one or more plasticizers in an amount effective to plasticize said elastomer and said copolymer and one or more reinforcing materials selected from the group consisting of carbon black, mica, hydrated silica, colloidal silica, mineral fibers and organic fibers, and optionally including one or more materials independently selected from the group consisting of fire-retardant materials and hydrocarbon-resistant tactifying resins.

2. The adhesive, sealant or mastic composition of claim 1, wherein said lower alkyl and lower alkoxyalkyl groups contain up to six carbon atoms.

3. The adhesive, sealant or mastic composition of claim 2, wherein said lower alkyl and lower alkoxyalkyl groups are selected from the group consisting of ethyl, butyl and methoxyethyl groups.

4. The adhesive, sealant or mastic composition of claim 1, wherein said liquid butadiene acrylonitrile copolymer and said polyacrylate elastomer are present in a weight ratio between about 5:95 and about 5:50.

5. The adhesive, sealant or mastic composition of claim 1, which is a hydrocarbon-resistant sealant, wherein said liquid butadiene acrylonitrile copolymer and said polyacrylate elastomer are present at a combined level of about 100 parts by weight, and wherein said one or more plasticizers are present in an amount from about 15 to about 190 parts by weight.

6. The hydrocarbon-resistant sealant of claim 5, wherein said one or more reinforcing materials are present in an amount from about 10 to about 75 parts by weight.

7. The adhesive, sealant or mastic composition of claim 1, which is a hydrocarbon-resistant sealant wherein said one or more plasticizers are selected from the group consisting of lower alkyl dicarboxylic acid ester plasticizers, phosphate ester plasticizers, halogenated organophosphate ester plasticizers, halogenated organophosphonate ester plasticizers and halogenated diphenyl oxides.

8. The hydrocarbon-resistant sealant of claim 7, wherein at least one of said one or more plasticizers is selected from the group consisting of esters of dicarboxylic acids of up to seven carbon atoms in length.

9. The hydrocarbon-resistant sealant of claim 8, wherein each of said esters of dicarboxylic acids plasticizers comprises two ester groups that are the same or different and are selected from the group consisting of benzyl, alkyl, alkylbenzyl, alkoxyalkyl and phenoxyalkyl esters.

10. The hydrocarbon-resistant sealant of claim 9, wherein said at least one of said one or more plasticizers is selected from the group consisting of alkylbenzyl phthalates.

11. The hydrocarbon-resistant sealant of claim 9, wherein said at least one of said one or more plasticizers is the bis [2-(2-butoxyethoxy) ethyl] ester of hexanedioic acid.

12. The hydrocarbon-resistant sealant of claim 7, wherein at least one of said one or more plasticizers is selected from phosphate ester plasticizers.

13. The hydrocarbon-resistant sealant of claim 12, wherein each of said phosphate ester plasticizers comprises two or more ester groups that are the same or different and are selected from the group consisting of phenyl, alkyl, alkylphenyl, alkoxyalkyl and phenoxyalkyl esters.

14. The hydrocarbon-resistant sealant of claim 13, wherein said phosphate ester plasticizers are selected from the group consisting of isopropyl phenyl diphenyl phosphate, 2-ethylhexyl diphenyl phosphate, isodecyl diphenyl phosphate, t-butyl phenyl diphenyl phosphate, tricresyl phosphate, tributyl phosphate, tributoxyethyl phosphate and triphenyl phosphate.

15. The hydrocarbon-resistant sealant of claim 14, wherein said phosphate ester plasticizer is tricresyl phosphate.

16. The hydrocarbon-resistant sealant of claim 7, wherein at least one of said one or more plasticizers is selected from halogenated organophosphate ester plasticizers.

17. The hydrocarbon-resistant sealant of claim 16, wherein said halogenated organophosphate ester plasticizers are selected from the group consisting of tri (beta-chloroethyl) phosphate, tri (beta, beta'-dichloroisopropyl) phosphate, tetrakis (2-chloroethyl)ethylene diphosphate, tetrakis(2-chloroisopropyl) ethylene diphosphate and chlorinated oligomeric, phosphate esters.

18. The hydrocarbon-resistant sealant of claim 17, wherein said halogenated organophosphate ester plasticizer is selected from the group consisting of chlorinated oligomeric phosphate ester, tetrakis(2-chloroethyl)ethylene diphosphate and mixtures thereof.

19. The hydrocarbon-resistant sealant of claim 7, wherein at least one of said one or more plasticizers is selected from halogenated organophosphonate ester plasticizers.

20. The hydrocarbon-resistant sealant of claim 19, wherein said halogenated organophosphonate ester plasticizers are selected from the group consisting of bis (2-chloroethyl) -2-chloroethanephosphonate and chlorinated oligomeric phosphonate esters.

21. The hydrocarbon-resistant sealant of claim 20, wherein said halogenated organophosphonate ester plasticizers are selected from chlorinated oligomeric phosphonate esters.

22. The hydrocarbon-resistant sealant of claim 7, wherein at least one of said one or more plasticizers is selected from halogenated diphenyl oxides.

23. The hydrocarbon-resistant sealant of claim 22, wherein said halogenated diphenyl oxide is pentabromodiphenyl oxide.

24. The adhesive, sealant or mastic composition of claim 1, which is a hydrocarbon-resistant sealant, wherein at least one of said one or more reinforcing materials is an organic fiber.

25. The hydrocarbon-resistant sealant of claim 19, wherein said one or more reinforcing materials is carbon black.

26. The adhesive, sealant or mastic composition of claim 1, which is a hydrocarbon-resistant sealant, further comprising one or more fire-retardant materials selected from the group consisting of alumina trihydrate, magnesium carbonate and magnesium hydroxide hydrate.

27. The hydrocarbon-resistant sealant of claim 26, wherein said one or more fire-retardant materials is present in an amount between about 100 and about 300 parts by weight per 100 parts of said liquid butadiene acrylonitrile copolymer and said polyacrylate elastomer, combined, whereby said sealant is flame-resistant.

28. The hydrocarbon-resistant flame-resistant sealant of claim 26, wherein at least one of said one or more fire-retardant materials is alumina trihydrate.

29. The hydrocarbon-resistant flame-resistant sealant of claim 28, wherein said one or more plasticizers are selected from the group consisting of phosphate ester plasticizers, halogenated organo-phosphate ester plasticizers, halogenated organo-phosphonate plasticizers and halogenated diphenyl oxide plasticizers.

30. The hydrocarbon-resistant flame-resistant sealant of claim 29, having an oxygen index greater than 30 as determined by ASTM D2863.

31. The adhesive, sealant or mastic composition of claim 1, which is a hydrocarbon-resistant sealant further comprising one or more hydrocarbon-resistant tackifying resins selected from the group consisting of natural and modified rosins, glycerol and pentaerythritol esters of natural and modified rosins, phenolic-modified terpene resins, and aromatic petroleum hydrocarbon resins and the hydrogenated derivatives thereof.

32. The hydrocarbon-resistant sealant of claim 31, wherein said tackifying resin is present in an amount up to about 60 parts by weight.

33. The adhesive, sealant or mastic composition of claim 1, which is a hydrocarbon-resistant sealant, comprising 100 parts by weight of said elastomer and said copolymer combined; wherein said sealant includes from about 15 to about 40 parts by weight of said liquid butadiene acrylonitrile copolymer and from about 60 to about 85 parts by weight of said polyacrylate elastomers; from about 45 to about 135 parts by weight of said one or more plasticizers; and from about 20 to about 55 parts by weight of said one or more reinforcing materials.

34. The hydrocarbon-resistant sealant of claim 33, wherein at least one of said one or more plasticizers is selected from phosphate ester plasticizers present in an amount between 45 and about 110 parts by weight, and which sealant further comprises one or more flame retardant materials present in an amount from about 165 to about 290 parts by weight wherein at least one of said flame retardant material is alumina trihydrate, whereby said sealant is flame-resistant.

* * * * *